(12) United States Patent
Jáskiewicz et al.

(10) Patent No.: US 11,661,992 B2
(45) Date of Patent: May 30, 2023

(54) HYDRAULIC DAMPING VALVE

(71) Applicant: Hamilton Sundstrand Corporation, Charlotte, NC (US)

(72) Inventors: Zbigniew Jáskiewicz, Wrocław (PL); Mateusz Wnuczko, Wrocław (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 202 days.

(21) Appl. No.: 17/088,811

(22) Filed: Nov. 4, 2020

(65) Prior Publication Data
US 2021/0156448 A1    May 27, 2021

(30) Foreign Application Priority Data
Nov. 22, 2019  (EP) .................................... 19461609

(51) Int. Cl.
*F16F 9/34*    (2006.01)
*F16F 9/20*    (2006.01)
*F16F 9/516*    (2006.01)
*B64C 27/00*   (2006.01)

(52) U.S. Cl.
CPC .................. *F16F 9/34* (2013.01); *F16F 9/20* (2013.01); *F16F 9/5165* (2013.01); *B64C 27/001* (2013.01)

(58) Field of Classification Search
CPC ...... F16K 17/04; F16K 17/0433; F16K 17/06; F16F 9/20; F16F 9/34; F16F 9/48; F16F 9/5165; F16F 9/19; F16F 9/512; B64C 27/001
USPC ......... 188/313, 318, 322.13, 322.2; 137/528, 137/529, 533.11, 625.29, 625.33
See application file for complete search history.

(56) References Cited

U.S. PATENT DOCUMENTS

| 2,554,774 | A |   | 5/1951 | Buivid |
| 2016/0273668 | A1 | * | 9/2016 | Trotzko ................. F16K 15/026 |
| 2018/0202506 | A1 | * | 7/2018 | Jaskiewicz ........... F16K 17/0433 |

FOREIGN PATENT DOCUMENTS

| DE | 2254263 A1 |   | 5/1974 |   |
| DE | 10155629 A1 | * | 5/2003 | ......... F16K 17/0433 |
| EP | 3328884 A2 |   | 6/2018 |   |
| EP | 3348884 A1 |   | 7/2018 |   |

(Continued)

OTHER PUBLICATIONS

Extended European Search Report for International Application N. 19461609.0 dated May 12, 2020, 7 pages.

*Primary Examiner* — Christopher P Schwartz
(74) *Attorney, Agent, or Firm* — Cantor Colburn LLP (57) ABSTRACT

A damping valve for a hydraulic damper (D) comprises a valve housing comprising an inlet chamber and an outlet chamber. A housing valve seat is arranged between the inlet chamber and the outlet chamber. A valve element having a cylindrical first portion is slidably received in a cylindrical bore of the valve housing and a second portion has a valve surface for selectively engaging and disengaging the housing valve seat to allow passage of hydraulic fluid between the inlet chamber and the outlet chamber. A spring element is mounted within the valve housing for biasing the valve element into engagement with the housing valve seat. The bore of the valve housing has a closed end defining a bore chamber between an end of the first portion of the valve element and the closed end of the bore. A first passage provides fluid communication between the bore chamber and the inlet chamber.

22 Claims, 5 Drawing Sheets

(56) References Cited

FOREIGN PATENT DOCUMENTS

| GB | 643474 A | 9/1950 |
|---|---|---|
| KR | 20130122856 A | 11/2013 |
| WO | 2017021815 A2 | 2/2017 |

\* cited by examiner

HYDRAULIC DAMPING VALVE

FOREIGN PRIORITY

This application claims priority to European Patent Application No. 19461609.0 filed Nov. 22, 2019, the entire contents of which is incorporated herein by reference.

TECHNICAL FIELD

The present disclosure relates to hydraulic dampers and in particular to a hydraulic damping valve for use by hydraulic damper.

BACKGROUND

Hydraulic dampers are used in a wide variety of applications. One application may be in the damping of helicopter rotor blades. Helicopter rotor blades may perform undesirable vertical, rotational or longitudinal movements relative to a rotor hub in use and hydraulic dampers may be used in damping such movements The damper typically comprises a damping valve which comprises a spring loaded valve element arranged between inlet and outlet chambers of a valve housing and to which hydraulic fluid is supplied or removed. Depending on the relative pressures existing in the inlet and outlet chambers, the valve element may open to allow hydraulic fluid to pass through a nozzle formed between the valve element and its housing. The flow of hydraulic fluid through passages in the valve provides a damping effect. A hydraulic damping valve of this type is disclosed in EP 3328884 A1.

The present disclosure provides a damping valve of this type.

SUMMARY

According to a first aspect of the present disclosure, there is provided a damping valve for a hydraulic damper. The valve comprises a valve housing comprising an inlet chamber and an outlet chamber, a housing valve seat arranged between the inlet chamber and the outlet chamber and a valve element having a cylindrical first portion slidably received in a cylindrical bore of the valve housing and a second portion having a valve surface for selectively engaging and disengaging the housing valve seat to allow passage of hydraulic fluid between the inlet chamber and the outlet chamber. A spring element is mounted within the valve housing for biasing the valve element into engagement with the housing valve seat. The bore of the valve housing has a closed end defining a bore chamber between an end of the first portion of the valve element and the closed end of the bore. At least one first passage provides fluid communication between the bore chamber and the inlet chamber. At least one second passage provides fluid communication between the bore chamber and the inlet chamber. A one-way valve is located in the at least one second passage and configured to allow flow in the at least one second passage in a direction from the inlet chamber to the bore chamber, but to block flow in the at least one second passage in a direction from the bore chamber to the inlet chamber.

In an embodiment of the above, the at least one first passage comprises at least one axially extending passage formed in the valve element and extending from at least one aperture formed at the end of the first portion of the valve element to at least one aperture which communicates with the inlet chamber, and the at least one second passage comprises at least one axially extending passage formed in the valve element and extending from at least one aperture formed at the end of the first portion of the valve element to at least one aperture which communicates with the inlet chamber.

According to a further aspect of the present disclosure, there is provided a valve element for a hydraulic damping valve. The valve element comprises a cylindrical first portion for slidable reception in a bore of a valve housing and a second portion having a valve surface for selectively engaging and disengaging a housing valve seat. The first portion of the valve element has at least one first axially extending passage formed therein extending between at least one inlet aperture at one end of the first portion of the valve element and at least one outlet aperture formed at an opposite end of the first portion or between the first portion and the second portion of the valve element. The first portion of the valve element also has at least one second axially extending passage formed therein extending between at least one inlet aperture at the one end of the first portion of the valve element and at least one outlet aperture formed at the opposite end of the first portion or between the first portion and the second portion of the valve element. The at least one second passage comprises a one-way valve configured to allow flow through the at least one second passage to the one end of the valve element but to block flow through the at least one second passage from the one end of the valve element.

In a further embodiment of any of the above, the first portion of the valve element comprises a one-way valve chamber. The at least one second passage comprises at least one second passage first portion extending from the inlet aperture of the second passage into the one-way valve chamber, and a second passage second portion extending between the one-way valve chamber and the at least one outlet aperture of the second passage. The one-way valve is located in the one-way valve chamber.

In a further embodiment of any of the above, the at least one first passage comprises at least one first passage first portion extending between the inlet aperture of the first passage and the one-way valve chamber, and at least one first passage second portion extending between the one-way valve chamber and the at least one outlet aperture of the first passage. The at least one first passage bypasses the one-way valve.

In a further embodiment of any of the above, the first portion of the first passage and the first portion of the second passage are a common passage.

In a further embodiment of any of the above, the first portion of the valve element comprises a valve element bore extending into the valve element from the one end of the valve element, the open end of the valve element bore being closed by a plug which defines the one-way valve chamber between an end thereof and a base of the valve element bore.

In an embodiment of the above, the first portions of the first and second passages are formed through the plug.

In a further embodiment of any of the above, the one-way valve comprises a one-way valve element and a one-way valve seat for engagement with the one-way valve element. The one-way valve seat is located in the one-way valve chamber at the entrance to the at least second passage second portion.

In an embodiment of the above, the one-way valve comprises a cage located in the one-way valve chamber and supporting the one-way valve element.

In a further embodiment of any of the above, the one-way valve element is a ball or is bullet shaped.

In a further embodiment of any of the above, the damping valve and/or valve element further comprises a biasing member configured to bias the one-way valve element against the one-way valve seat In an embodiment of the above, the biasing member is a spring.

In a further embodiment of any of the above, the at least one second passage second portion comprises a first section extending from the one-way valve chamber and at least one angled second section extending from the end of the first section to the at least one outlet aperture of the second passage.

In a further embodiment of any of the above, the damping valve further comprises at least one axially extending channel formed in a radially inwardly facing surface of the bore. A first end of the channel opens into the inlet chamber. A second, opposed end is selectively exposed or closed by the first portion of the valve element as it slides in the bore to selectively communicate the channel with the bore chamber.

In a further embodiment of any of the above, the first and second portions of the valve element are connected by a third, smaller diameter section around which the inlet chamber is arranged.

In a further embodiment of any of the above, the at least one second aperture is formed in a fillet joining the first and third sections of the valve element.

In a further embodiment of any of the above, the at least one axially extending channel second end is axially spaced from the closed end of the bore.

In a further embodiment of any of the above, the second end of the axially extending channel has a chamfer such that the radial depth of the axially extending channel decreases progressively at the second end of the axially extending channel.

In a further embodiment of any of the above, the damping valve comprises a plurality of the axially extending channels in the radially inwardly facing surface of the bore.

In an embodiment of the above, the axially extending channels are equi-spaced circumferentially around the circumference of the bore and/or comprise a pair of diametrically opposed channels.

The present disclosure also provides a hydraulic damper comprising a piston arranged for reciprocating movement within a cylinder and dividing the cylinder into first and second fluid chambers and a damping valve in accordance with the disclosure. A first fluid passage fluidly connects the first fluid chamber to the inlet chamber of the damping valve and a second fluid passage fluidly connecting the second fluid chamber to the outlet chamber of the damping valve.

In an embodiment of the above, the hydraulic damper further comprises:

a second damping valve in accordance with the disclosure, a third fluid passage fluidly connecting the first fluid chamber of the cylinder to the outlet chamber of the second damping valve, and a fourth fluid passage fluidly connecting the second fluid chamber of the cylinder to the inlet chamber of the second damping valve.

There is also provided a helicopter rotor system comprising a hydraulic damper according to the disclosure and a helicopter rotor, the helicopter rotor being coupled to the piston of the hydraulic damper.

BRIEF DESCRIPTION OF DRAWINGS

An embodiment of the disclosure will now be described by way of example only with reference to the accompanying drawings in which.

DETAILED DESCRIPTION

Figure 1:
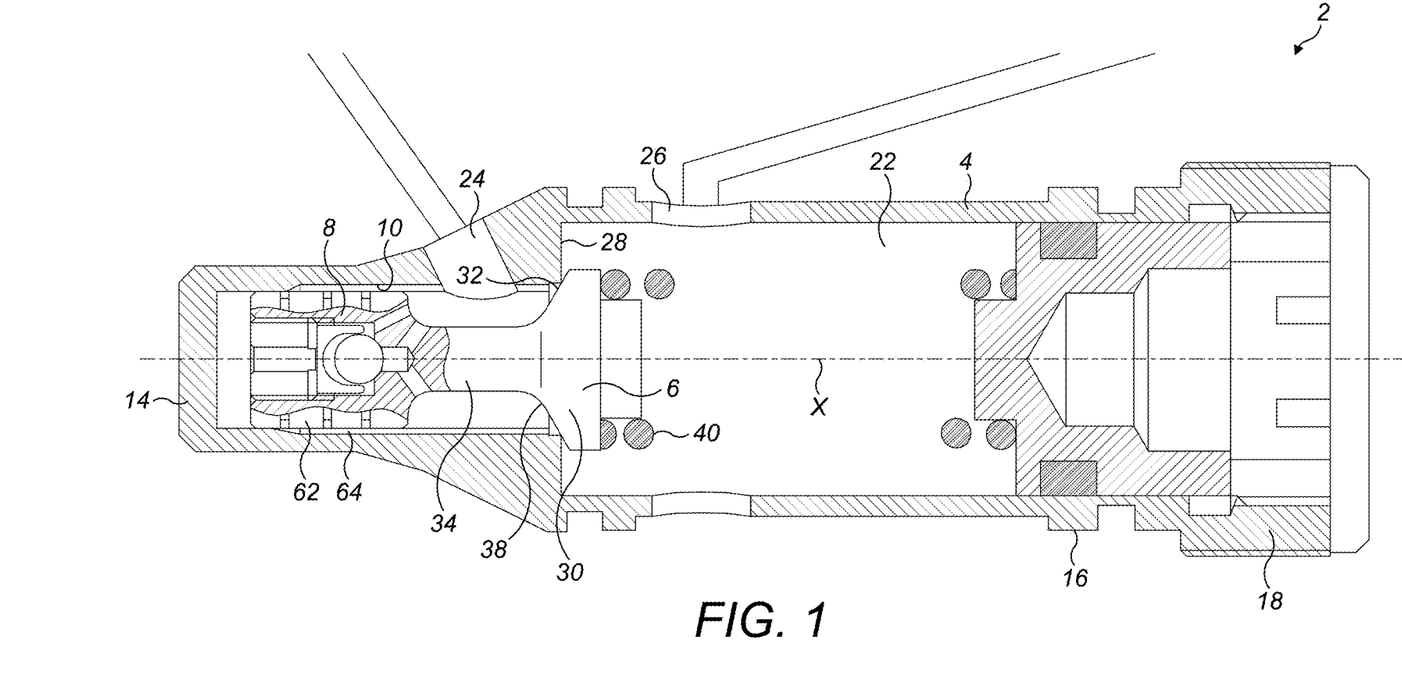
FIG. 1 shows a partially sectioned view of a damping valve in accordance with the disclosure.

With reference to FIG. 1, a damping valve 2 comprises a valve housing 4 and a valve element 6. The valve element 6 comprises a cylindrical first portion 8 which is slidably received in a cylindrical bore 10 formed at one end 12 of the valve housing 4. The bore 10 is closed by an end wall 14. The other end 16 of the valve housing 4 is closed by a cap 18.

The valve housing 4 further comprises an inlet chamber 20 and an outlet chamber 22. An inlet opening 24 opens into the inlet chamber 20 and an outlet opening 26 opens into the outlet chamber 22. The terms inlet and outlet used in this context are relative to fluid flow which will act to open the valve 2. However, as will be described further below, depending on the operative condition of the valve 2, hydraulic fluid may either enter or exit the valve 2 via either of these chambers.

A housing valve seat 28 is formed between the inlet chamber 20 and outlet chamber 22. The housing valve seat 28 may comprise an annular edge or annular surface as is known in the art.

The valve element 6 further comprises a second portion 30 having a valve surface 32 which, in a closed condition of the valve 2, seats on the housing valve seat 28 to close the valve 2.

The first portion 8 of the valve element 6 and the second portion 30 of the valve element 6 are connected by a smaller diameter, third portion 34. The first portion 8 and the third portion 30 are connected by a first fillet 36. The second portion and third portion 34 are connected by a second fillet 38.

A coil spring 40 is mounted between the second portion 30 of the valve element 6 and the cap 18. The coil spring 40 biases the valve surface 32 of the valve element 6 into engagement with the housing valve seat 28 of the valve housing 4.

Figure 2:
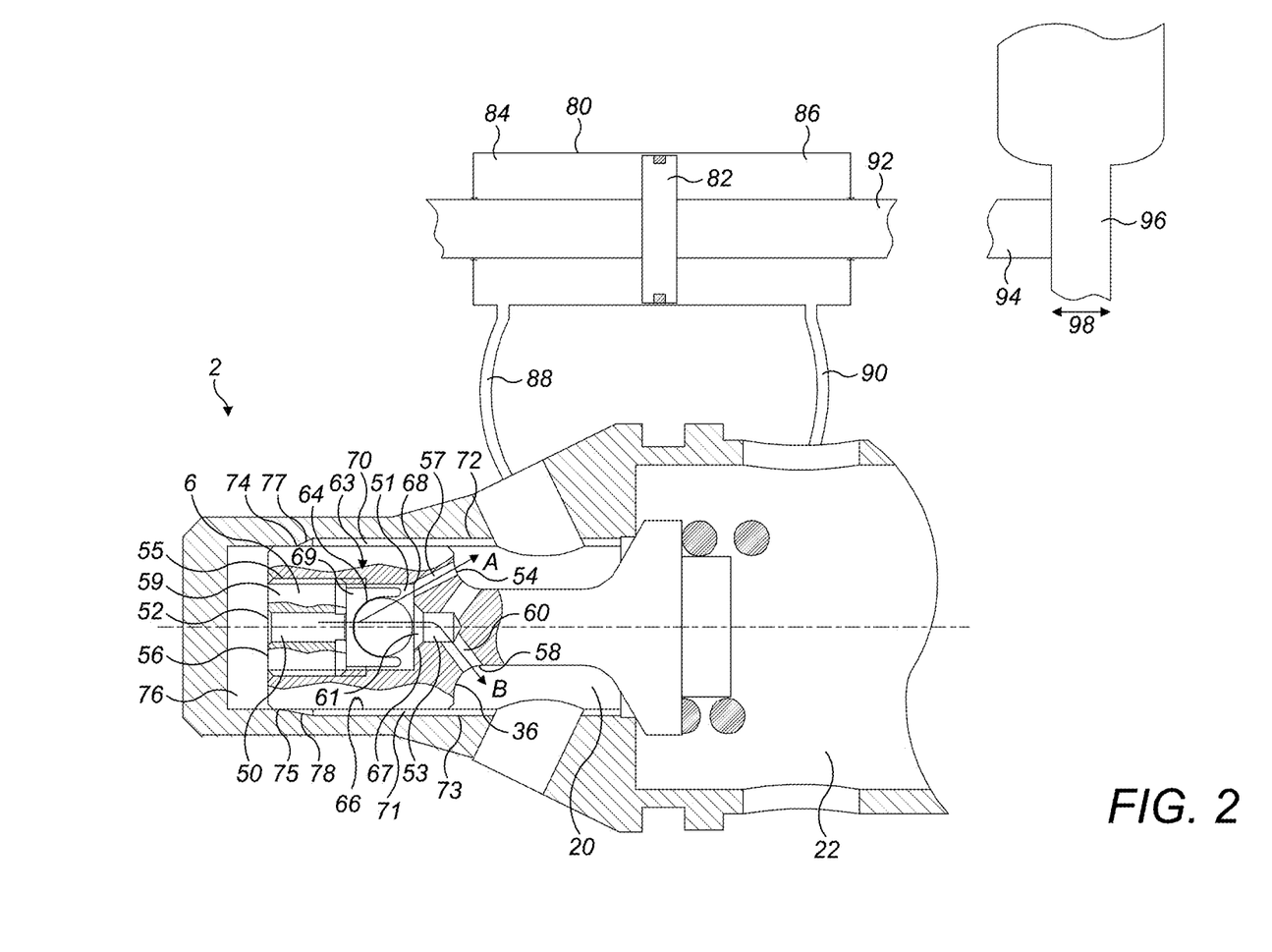
FIG. 2 shows a hydraulic damper incorporating the damping valve of FIG. 1, in a first operative condition.

As can most clearly be seen in FIG. 2, the first portion 8 of the valve element 6 comprises a central passage 50 extending from an inlet aperture 52 in an end surface 56 of the first portion 8 along the central axis A of the valve element 6. The central passage 50 is fluidly connected to a one-way valve chamber 51 located in the first portion 8.

Extending from an inlet 61 located at the axially opposite end of the one-way valve chamber 51 to the central passage 50 is another axially extending passage 53. The axially extending passage 53 branches, at an axially opposite end to the inlet 61, into at least one angled passage 60 which extends at an angle relative to the central axis X. The at least one angled passage 60 extends to at least one respective outlet aperture 58 located in the inlet chamber 20. The at least one angled passage 60 may include two or more passages 60 which may be circumferentially equi-spaced about the central axis X.

A one-way valve 63 is located in the one-way valve chamber 51. The one-way valve 63 comprises a one-way valve seat 67 located at the inlet 61 to the passage 53 and a one-way valve element 64 located in the one-way valve chamber 51 to engage and disengage with the one-way valve seat 67. The one-way valve element 64 may be a ball, as shown, or bullet shaped. The one-way valve 63 may also comprise a cage 69 located in the one-way valve chamber 51 to support the one-way valve element 64. The cage 69 may be cylindrical and may extend axially to allow the one-way valve element 64 to move freely in an axial direction but to limit radial movement. The cage 69 comprises gaps to allow fluid to flow freely through it.

At least one other passage 57 extends from a respective inlet 68 located in the one-way valve chamber 51 to a respective outlet aperture 54 located in the inlet chamber 20. The inlet 68 to the at least one passage 57 is radially spaced from the one-way valve seat 67 such that the at least one passage 57 bypasses the one-way valve 63. The at least one passage 57 may comprise at least two passages 57 and the outlet apertures 54 of the at least two passages 57 may be circumferentially equi-spaced about the central axis X.

The central passage 50 together with the passage 57 and one-way valve chamber 51 provide a first passage A for fluid through the valve element 6. The central passage 50, the one-way valve chamber 51, the axially extending passage 52 and the at least one angled passage 60 provide a second passage B for fluid through the valve element 6. In particular, the central passage 50 constitutes a first passage first portion and also a second passage first portion. The at least one passage 57 constitutes a first passage second portion. The at least one angled passage 60 constitutes a second passage second portion.

The one-way valve 63 may further comprise a biasing member (not shown) to bias the one-way valve element 64 against the one-way valve seat 67. The biasing member may comprise a spring.

The at least one outlet aperture 54 of the at least one passage 57 and the at least one outlet aperture 58 of the at least one angled passage 60 are located in the first fillet 36. Of course the outlet apertures 54, 58 may be provided in a location other than the first fillet 36. What is important is that the outlet apertures 54, 58 open into, i.e. are in fluid communication with, the inlet chamber 20. Thus in other embodiments, the outlet apertures 54, 58 may be provided in an axially facing surface of the first portion 8, or in the third portion 34 of the valve element 6.

While a single central passage 50 has been illustrated in the embodiment, a plurality of axially extending passages 50 may be provided, for example symmetrically arranged about the central axis A of the valve element 6.

Figure 6:
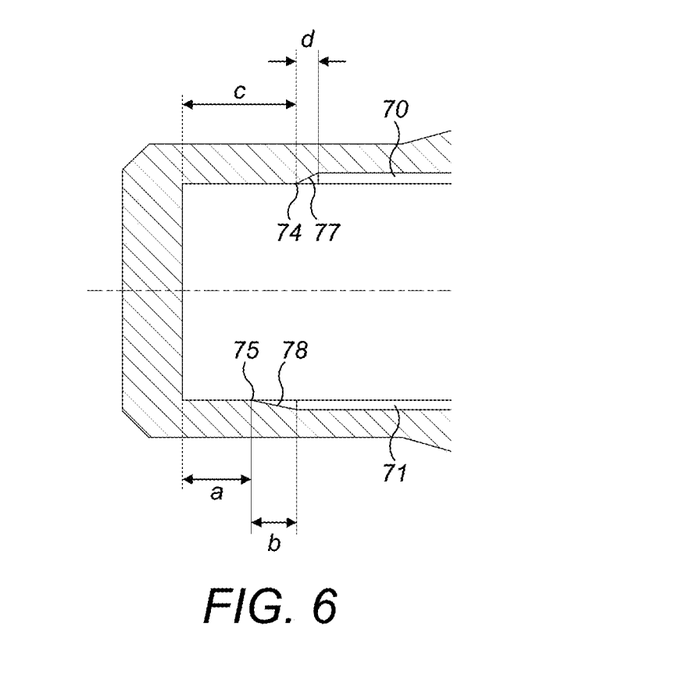
FIG. 6 shows an illustration of channels of a housing portion of a hydraulic damper.

As illustrated in FIGS. 2 and 6, the first portion 8 of the valve element 6 comprises a valve element bore 55 which extends axially into the first portion 8 from an opening in the end surface 56. The valve element bore 55 is generally cylindrically shaped and is closed by a cylindrical plug 59. The plug 59 and valve element bore 55 may be threaded to effect the mounting of the plug 59. In other embodiments, the plug 59 may be a push fit in the valve element bore 55. The plug 59 is shorter in length axially than the valve element bore 55, thereby defining the one-way valve chamber 51 in the valve element bore 55 when the plug 59 is inserted into the valve element bore 55. Axial movement of the plug 59 into the valve element bore 55 may be limited by means of a shoulder defined in the valve element bore 55. The central passage 50 is formed through the plug 59.

The outer surface 62 of the first portion 8 of the valve element 6 is formed with a plurality of axially spaced grooves 64 extending completely around the circumference of the first portion 8. The grooves 64 act to provide a more even distribution of pressure around the first portion 8 of the valve element 6. In this embodiment, there are three such grooves 64, but more or less grooves 64 may be provided. In certain embodiments, these grooves 64 may be omitted.

As illustrated most clearly in FIG. 2, the radially inwardly facing surface 66 of bore 10 is formed with a pair of diametrically opposed, axially extending first and second channels 70,71. In other embodiments, only a single channel 70 may be provided. In other embodiments, multiple first and/or second channels 70, 71 may be provided. The first and second channels 70, 71 may be circumferentially equi-spaced around the axis X.

In the illustrated embodiment, the first channel 70 comprises a first end 72 which opens into the inlet chamber 20 of the valve housing 4 and a second end 74 adjacent the end wall 14 of the bore 10. Similarly, the second channel 71 comprises a first end 73 which opens into the inlet chamber 20 of the valve housing 4 and a second end 75 adjacent the end wall 14 of the bore 10. As can be seen in FIGS. 1 and 2, when the valve element 6 is in a closed position, the end surface 56 of the valve element first portion 8 extends beyond the second ends 74, 75 of the channels 70, 71 thereby isolating the channels 70, 71 from a bore chamber 76 formed between the end wall 14 of the bore 10 and the end surface 56 of the valve element first portion 8.

The second ends 74, 75 of the first and second channels 70, 71 have chamfers 77, 78 such that the radial depth d of the channels 70, 71 decreases progressively at the second ends 74, 75 of the channels 70, 71. In the illustrated embodiment, the chamfers are linear, although in other embodiments, they may have a curved profile. As can be seen in FIG. 2, the first channel second end 74 is located at an axially different location (in this embodiment nearer the inlet chamber 20) to the second channel second end 75 (located nearer the bore chamber 76). As can be seen in FIG. 6, in this embodiment the second end 74 of the first channel 70 is axially aligned with the end of the chamfer 78 of the second channel 71. However, other relative axial positions can be chosen. The first and second channel chamfers may also have either the same or different gradients to each other: in this embodiment the first channel chamfer has a steeper gradient relative to the axis X than the second channel chamfer.

Figure 5:
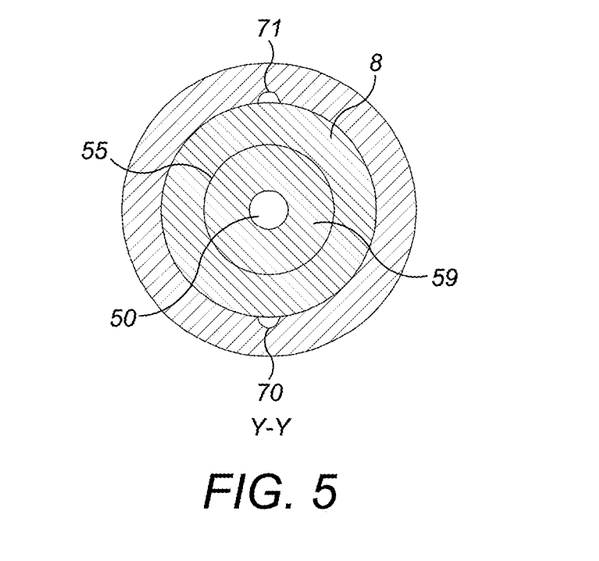
FIG. 5 shows a cross section Y-Y of FIG. 3.

Having described the structure of the damping valve 2 above, its use in a hydraulic damper D will now be described with reference to FIGS. 2, 3 and 5.

With reference to FIG. 2, the damping valve 2 is shown connected to a hydraulic cylinder 80 to form a hydraulic damper D. Hydraulic fluid fills both the cylinder 80 and the valve 2. The hydraulic cylinder 80 receives a reciprocating piston 82 which divides the cylinder 80 into a first fluid chamber 84 and a second fluid chamber 86. The first fluid chamber 86 is connected to the inlet chamber 20 of the valve 2 by means of a first fluid passageway 88. The second fluid chamber 86 is connected to the outlet chamber 22 of the valve 2 by a second fluid passageway 90. The valve 2 may be incorporated in a common housing with the cylinder 80 in certain embodiments. The piston 82 has a piston rod 92 which is connected by a suitable linkage 94 to a helicopter blade 96 which, in use, may move backwards and forwards along an axis as illustrated by arrow 98 in FIG. 2.

In FIG. 2, the valve 2 is shown in a closed condition such that the valve element surface 32 engages with the housing valve seat 28. In this condition there is no fluid flow between the inlet chamber 20 and the outlet chamber 22. However, in the event that a force F is applied to the piston rod 92 by the blade 96, the piston 82 forces hydraulic fluid from the first fluid chamber 84 through the first fluid passageway 88 and into the inlet chamber 20 of the damping valve 2. This causes the valve element 6 to move to the right in the sense of the Figures against the force of the spring 40.

Damping is effected in four phases during this opening movement, as will be described in further detail below. In a first phase in which the valve element 6 travels over distance "a" as shown in FIG. 6, from its fully closed position to the position in which the end surface 56 becomes aligned with the endpoint 75 of the second channel 71, damping is performed by throttling the flow of hydraulic fluid through the opening 100 formed between the housing valve seat 28 and valve surface 32 (see FIG. 3), by throttling hydraulic fluid through the first passage A and second passage B from the inlet chamber 22 into the bore chamber 76, and by the spring 40.

In a second phase, in which the valve element 6 travels over a distance "b" corresponding to the axial length of the chamfered portion 78 of the second channel 71, the damping due to the spring 40 increases as it is compressed and the damping due to the hydraulic fluid is progressively reduced by virtue of additional flow of hydraulic fluid through the second channel 71. The damping effect is progressively reduced due to the sloping shape of the channel end 75.

In a third phase, in which the valve element 6 moves beyond the distance "c" (where "a"+"b"="c") corresponding to the axial length of the chamfered portion 77 of the first channel 70, the damping effect of the spring continues to increase, and the damping due to the hydraulic fluid continues to reduce at a yet higher rate due to the additional flow of hydraulic fluid through the first channel 70.

In a fourth phase, in which the valve element 6 moves beyond the distance "d", the damping effect of the spring continues to increase and the damping of the oil flow remains at a constant value due to the constant cross-section of the first and second channels 70, 71 and the relatively large gap 100 at the housing valve seat 28.

The first and second channels 70, 71 therefore allow four phases during opening movement. The channel lengths and chamfer gradients can be selected to optimise damping requirements, and therefore opening speeds, for the system, and having four different phases allows greater flexibility. It will also be appreciated that various channel axial lengths and chamfer gradients may be provided, for example the distance "c" may be greater or smaller than "a"+"b".

When a force F' is applied to the piston rod 92 in an opposite direction to the force F then hydraulic fluid moves from the second fluid chamber 86 of the cylinder 80 through the second fluid passageway 90 into the outlet chamber 32 of the valve 2. This will force the valve element 6 to the left in the sense of the Figures to close the valve 2. However, damping is also effected during this movement.

In a first stage damping is performed by the flow of hydraulic fluid around the valve surface 32 between the housing valve seat 28 and the valve plug 30 and also by the flow of hydraulic fluid from the bore chamber 76 through the first passage A i.e. through the central passage 50 of the valve first portion 8 and through the at least one passage 57, and the channels 70, 71 in the bore 10 to the inlet chamber 20. The one-way valve 63 is closed during this movement due to the increased pressure created in the bore chamber 76. This will provide relatively low damping which means that the valve element 6 will move relatively quickly in this first phase.

As the valve element 6 moves further to the left, its end surface 56 will begin to align with the tapering end 74 of the first channel 70 which will increase the damping effect progressively.

As the valve element 6 moved further still to the left, its end surface 56 will begin to align with the tapering end 75 of the second channel 71 which will increase the damping effect at an even higher rate.

Once the end surface 56 of the valve element 6 moves beyond the end 75 of the second channel 71, the throttling will occur only through the first passage A. Since the one-way valve 63 is closed when the valve element 6 moves under force F' (to the left), flow can only flow out of the bore chamber 76 through the first passage A in this phase of movement. This will lead to a relatively higher damping force leading to the valve surface 26 engaging the housing valve seat 28 relatively softly, thereby protecting the valve element 6 and the housing valve seat 28.

The one-way valve 63 allows greater damping to occur when the valve element surface 32 contacts the housing valve seat 28 upon closing. This is due to the fact that the fluid can only flow out of the bore chamber through the first passage A in the last stage of movement ("a") under force F' and there will therefore be a greater resistance to flow out of the bore chamber 76. Thus, the fluid in the bore chamber 76 can reach a higher pressure, increasing its damping effect on the valve element 6. This reduces the impact between the valve surface 32 and the housing valve seat 28 thereby reducing the potential for damage and/or unwanted vibrations in the system.

However, since the one-way valve 63 allows flow through the second passage B when the valve element 6 is opening under force F, fluid can flow into the bore chamber 76 more quickly. This allows the valve element 6 to move faster in this direction. This is advantageous as it allows the valve element 6 to react more quickly in this direction when the damping valve 2 needs to be opened.

The speed of opening and closure of the valve element 6 can also be influenced by selection of the dimensions of the central passage 50, the dimensions of the first and second channels 70, 71 and also the dimensions and axial extent of the chamfers of the first and second channels 70, 71. For example, the steeper the angle of the chamfers more abrupt will be the deceleration of the valve element during closing (or acceleration upon opening). The degree of over travel of the valve element 6 relative to the ends 74, 75 of the channels 70, 71 determines the final closing of the valve and is decisive in the ultimate gentle engagement of the valve element 6 with the housing valve seat 28.

During middle and high frequency vibrations of the blade 96, little or minimal decrease in damping of the blades occurs due to incomplete closing of the valve between the valve surface 36 and housing valve seat 28. This is because, in practice, the changes in the movement of the blades transmitted to the piston 82 cause the piston 82 to change direction more quickly than the time required for the valve 2 to close fully. If the valve 2 were to close fully, the piston 82 would be decelerated very suddenly, leading to undesirable forces in the blade, which may, for example, lead to increased wear.

It will be appreciated that the main forces exerted by the hydraulic fluid within the valve 2 are axial. The embodiment illustrated seeks to minimise off axial forces by virtue of the construction of the valve element 6. In this regard, by providing a central passage 50 through the valve element 6, there is no net lateral force created due to the pressure of hydraulic fluid through that passage. Similarly, the symmetrical arrangement of the channels 70, 71, the at least one passage 57 and the at least one passage 60 will also cancel out lateral forces. This will reduce the wear of the valve element 6 the valve housing for 10, thereby extending the life of the valve 2. In one embodiment, there may be provided one passage 57 and one passage 60, where the outlets 54, 58 of each of the passages 57, 60 are arranged circumferentially equi-spaced at 180 degrees relative to one another about the central axis X and may be located at the same axial and radial positions relative to the central axis X.

Figure 3:
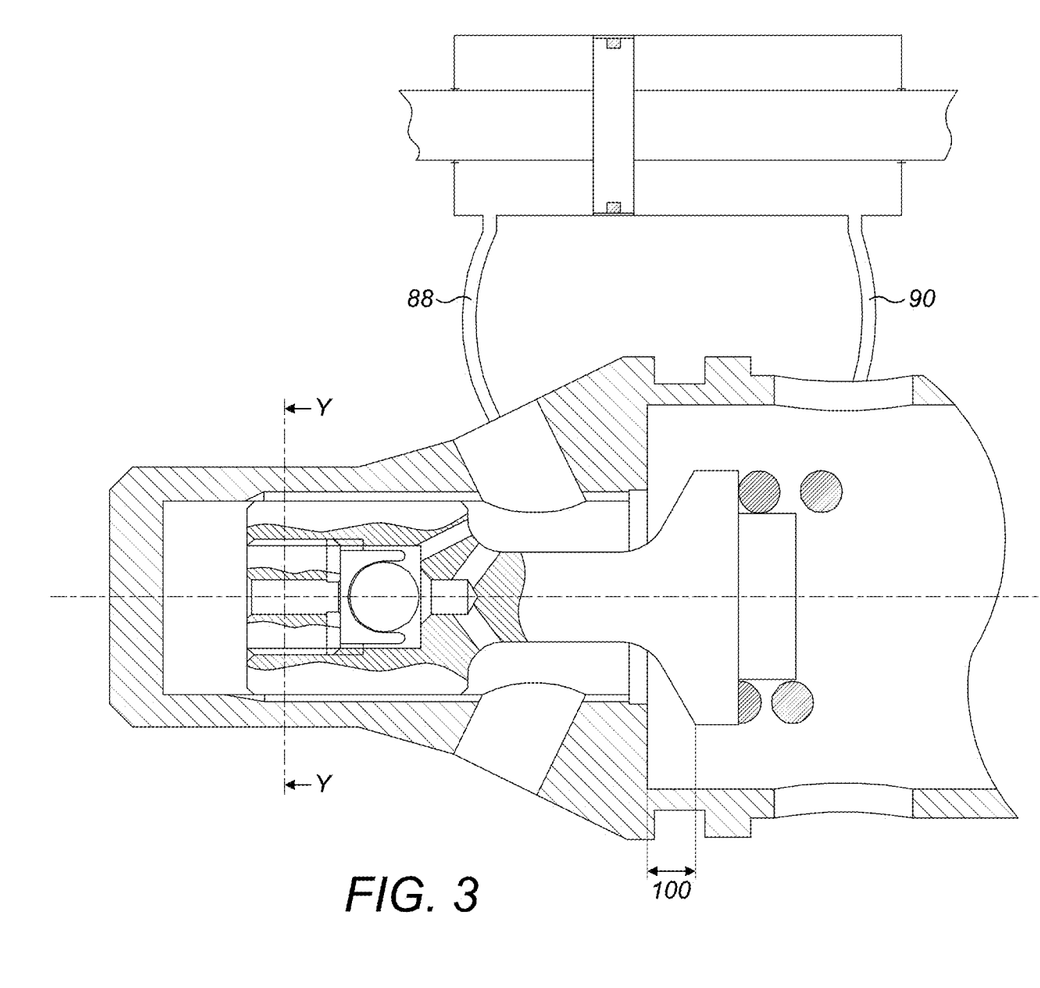
FIG. 3 shows the hydraulic damper of FIG. 2 in a second operative condition.
Figure 4:
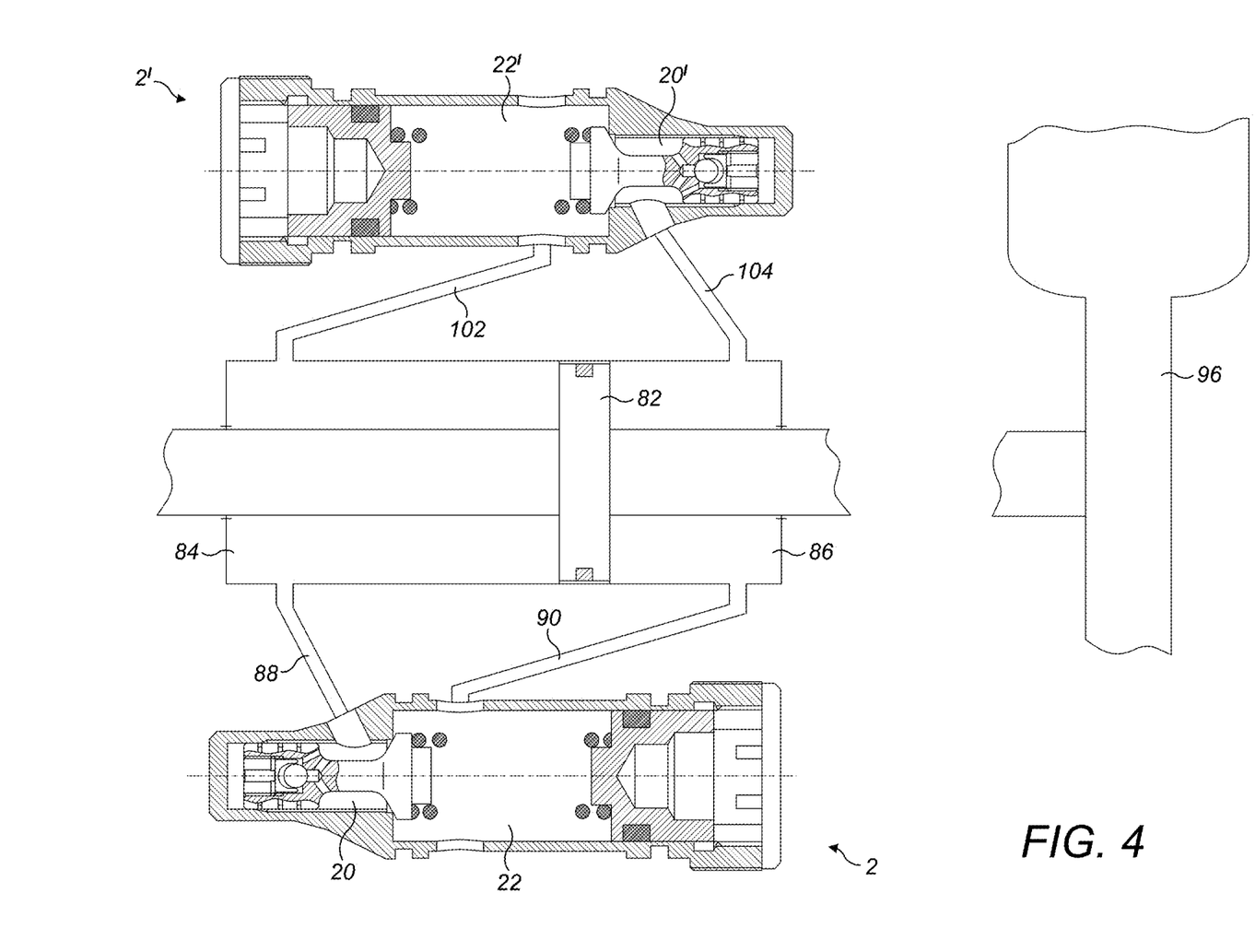
FIG. 4 shows a hydraulic damper incorporating a pair of damping valves.

As illustrated in FIGS. 2 and 3, a single valve 2 is shown coupled to the hydraulic cylinder 80. In the embodiment of FIG. 4, however, the cylinder 80 is connected with two damping valves 2, 2'. The first fluid chamber 84 of the cylinder 80 is connected to the inlet chamber 20 of the first damping valve 2 by means of the first fluid passageway 88. The second fluid chamber 86 of the cylinder 80 is connected to the outlet chamber 22 of the first damping valve 2 by the second fluid passageway 90. However, the first fluid chamber 84 is connected to the outlet chamber 22' of the second damping valve 2' by means of a third fluid passageway 102 and the second fluid chamber 86 connected to the inlet chamber 20' of the second damping valve 2' by a fourth fluid passageway 104. Such an arrangement further improves the damping on the rotor blade 96.

It will be understood that the above description is of just one embodiment of the disclosure and that modifications may be that made thereto without departing from the scope of the disclosure. In this regard, the embodiment described above illustrates the passages between the bore chamber 76 and the inlet chamber 20 as passing through the valve element 6. In an alternative embodiment, however, the passages may be formed through the valve housing 4. Passages may be formed through both the valve element 6 and the valve housing 4 in other embodiments.

It will be appreciated that in another embodiment, the first and second flow passages A, B may be completely separate from one another, i.e. share no common parts. The first flow passage A may therefore be a separate passage which flows through the valve element.

The invention claimed is:

1. A damping valve for a hydraulic damper (D), comprising:
    a valve housing comprising an inlet chamber and an outlet chamber;
    a housing valve seat arranged between the inlet chamber and the outlet chamber;
    a valve element having a cylindrical first portion slidably received in a cylindrical bore of the valve housing and a second portion having a valve surface for selectively engaging and disengaging the housing valve seat to allow passage of hydraulic fluid between the inlet chamber and the outlet chamber;
    a spring element mounted within the valve housing for biasing the valve element into engagement with the housing valve seat;
    the bore of the valve housing having a closed end defining a bore chamber between an end of the first portion of the valve element and the closed end of the bore;
    at least one first passage (A) providing fluid communication between the bore chamber and the inlet chamber, the at least one first passage (A) formed through and interior to the valve element;
    at least one second passage (B) providing fluid communication between the bore chamber and the inlet chamber; and
    a one-way valve located in the at least one second passage (B) and configured to allow flow in the at least one second passage (B) in a direction from the inlet chamber to the bore chamber, but to block flow in the at least one second passage (B) in a direction from the bore chamber to the inlet chamber.

2. The damping valve of claim 1, wherein the at least one first passage (A) comprises at least one axially extending passage formed in the valve element and extending from at least one aperture formed at the end of the first portion of the valve element to at least one aperture which communicates with the inlet chamber, and the at least one second passage (B) comprises at least one axially extending passage formed in the valve element and extending from at least one aperture formed at the end of the first portion of the valve element to at least one aperture which communicates with the inlet chamber.

3. The damping valve of claim 1, wherein:
    the first portion of the valve element comprises a one-way valve chamber;
    the at least one second passage (B) comprises at least one second passage first portion extending from an inlet aperture of the second passage (B) into the one-way valve chamber, and a second passage second portion extending between the one-way valve chamber and at least one outlet aperture of the second passage (B); and
    the one-way valve is located in the one-way valve chamber.

4. The damping valve of claim 3, wherein
    the at least one first passage (A) comprises at least one first passage first portion extending between the inlet aperture of the first passage (A) and the one-way valve chamber, and at least one first passage second portion extending between the one-way valve chamber and the at least one outlet aperture of the first passage, the at least one first passage (A) bypassing the one-way valve.

5. The damping valve of claim 4, wherein the first portion of the first passage (A) and the first portion of the second passage (B) are a common passage.

6. The damping valve of claim 3, wherein the first portion of the valve element comprises a valve element bore extending into the valve element from the one end of the valve element, the open end of the valve element bore being closed by a plug which defines the one-way valve chamber between an end thereof and a base of the valve element bore.

7. The damping valve of claim 6, wherein the first portions of the first and second passages (A, B) are formed through the plug.

8. The damping valve of claim 3, wherein the one-way valve comprises a one-way valve element and a one-way valve seat for engagement with the one-way valve element, wherein the one-way valve seat is located in the one-way valve chamber at the entrance to the at least second passage second portion.

9. The damping valve of claim 8, wherein the one-way valve comprises a cage located in the one-way valve chamber and supporting the one-way valve element.

10. The damping valve of claim 9, wherein the one-way valve element is a ball or is bullet shaped.

11. The damping valve of claim 8, further comprising a biasing member configured to bias the one-way valve element against the one-way valve seat, optionally wherein the biasing member is a spring.

12. The damping valve of claim 3, wherein the at least one second passage second portion comprises:
a first section extending from the one-way valve chamber and at least one angled second section extending from the end of the first section to the at least one outlet aperture of the second passage (B).

13. The damping valve of claim 1, further comprising at least one axially extending channel formed in a radially inwardly facing surface of the bore, a first end of the channel opening into the inlet chamber and a second, opposed end being selectively exposed or closed by the first portion of the valve element as it slides in the bore to selectively communicate the channel with the bore chamber.

14. A hydraulic damper (D) comprising:
a piston arranged for reciprocating movement within a cylinder and dividing the cylinder into first and second fluid chambers;
a damping valve as claimed in claim 1;
a first fluid passage fluidly connecting the first fluid chamber to the inlet chamber of the damping valve; and
a second fluid passage fluidly connecting the second fluid chamber to the outlet chamber of the damping valve.

15. A valve element for a hydraulic damping valve, comprising:
a cylindrical first portion for slidable reception in a bore of a valve housing; and
a second portion having a valve surface for selectively engaging and disengaging a housing valve seat, wherein:
the first portion of the valve element has at least one first axially extending passage formed through and interior to the valve element extending between at least one inlet aperture at one end of the first portion of the valve element and at least one outlet aperture formed at an opposite end of the first portion or between the first portion and the second portion of the valve element, and
the first portion of the valve element has at least one second axially extending passage formed therein extending between at least one inlet aperture at the one end of the first portion of the valve element and at least one outlet aperture formed at the opposite end of the first portion or between the first portion and the second portion of the valve element,
the at least one second passage (B) comprises a one-way valve configured to allow flow through the at least one second passage (B) to the one end of the valve element but to block flow through the at least one second passage (B) from the one end of the valve element.

16. The valve element of claim 15, wherein:
the first portion of the valve element comprises a one-way valve chamber;
the at least one second passage (B) comprises at least one second passage first portion extending from the inlet aperture of the second passage (B) into the one-way valve chamber, and a second passage second portion extending between the one-way valve chamber and the at least one outlet aperture of the second passage (B); and
the one-way valve is located in the one-way valve chamber.

17. The valve element of claim 16, wherein
the at least one first passage (A) comprises at least one first passage first portion extending between the inlet aperture of the first passage (A) and the one-way valve chamber, and at least one first passage second portion extending between the one-way valve chamber and the at least one outlet aperture of the first passage, the at least one first passage (A) bypassing the one-way valve.

18. The valve element of claim 17, wherein the first portion of the first passage (A) and the first portion of the second passage (B) are a common passage.

19. The valve element of claim 16, wherein the first portion of the valve element comprises a valve element bore extending into the valve element from the one end of the valve element, the open end of the valve element bore being closed by a plug which defines the one-way valve chamber between an end thereof and a base of the valve element bore.

20. The valve element of claim 19, wherein the first portions of the first and second passages (A, B) are formed through the plug.

21. A damping valve for a hydraulic damper (D), comprising:
a valve housing comprising an inlet chamber and an outlet chamber;
a housing valve seat arranged between the inlet chamber and the outlet chamber;
a valve element having a cylindrical first portion slidably received in a cylindrical bore of the valve housing and a second portion having a valve surface for selectively engaging and disengaging the housing valve seat to allow passage of hydraulic fluid between the inlet chamber and the outlet chamber;
a spring element mounted within the valve housing for biasing the valve element into engagement with the housing valve seat;
the bore of the valve housing having a closed end defining a bore chamber between an end of the first portion of the valve element and the closed end of the bore;
at least one first passage (A) providing fluid communication between the bore chamber and the inlet chamber;
at least one second passage (B) providing fluid communication between the bore chamber and the inlet chamber; and
a one-way valve located in the at least one second passage (B) and configured to allow flow in the at least one second passage (B) in a direction from the inlet chamber to the bore chamber, but to block flow in the at least one second passage (B) in a direction from the bore chamber to the inlet chamber, wherein:
the first portion of the valve element comprises a one-way valve chamber;
the at least one second passage (B) comprises at least one second passage first portion extending from an inlet aperture of the second passage (B) into the one-way valve chamber, and a second passage second portion extending between the one-way valve chamber and at least one outlet aperture of the second passage (B);
the one-way valve is located in the one-way valve chamber; and
the first portion of the valve element comprises a valve element bore extending into the valve element from the one end of the valve element, the open end of the valve element bore being closed by a plug which defines the one-way valve chamber between an end thereof and a base of the valve element bore.

22. A damping valve for a hydraulic damper (D), comprising:
a valve housing comprising an inlet chamber and an outlet chamber;
a housing valve seat arranged between the inlet chamber and the outlet chamber;

a valve element having a cylindrical first portion slidably received in a cylindrical bore of the valve housing and a second portion having a valve surface for selectively engaging and disengaging the housing valve seat to allow passage of hydraulic fluid between the inlet chamber and the outlet chamber;

a spring element mounted within the valve housing for biasing the valve element into engagement with the housing valve seat;

the bore of the valve housing having a closed end defining a bore chamber between an end of the first portion of the valve element and the closed end of the bore;

at least one first passage (A) providing fluid communication between the bore chamber and the inlet chamber;

at least one second passage (B) providing fluid communication between the bore chamber and the inlet chamber; and a one-way valve located in the at least one second passage (B) and configured to allow flow in the at least one second passage (B) in a direction from the inlet chamber to the bore chamber, but to block flow in the at least one second passage (B) in a direction from the bore chamber to the inlet chamber, wherein:

the first portion of the valve element comprises a one-way valve chamber;

the at least one second passage (B) comprises at least one second passage first portion extending from an inlet aperture of the second passage (B) into the one-way valve chamber, and a second passage second portion extending between the one-way valve chamber and at least one outlet aperture of the second passage (B);

the one-way valve is located in the one-way valve chamber; and the one-way valve comprises a one-way valve element and a one-way valve seat for engagement with the one-way valve element, wherein the one-way valve seat is located in the one-way valve chamber at the entrance to the at least second passage second portion.

\* \* \* \* \*